May 14, 1957 K. LEHOVEC 2,792,539

TRANSISTOR CONSTRUCTION

Filed July 7, 1953

INVENTOR.
KURT LEHOVEC

BY Connolly and Hutz

HIS ATTORNEYS

United States Patent Office 2,792,539

Patented May 14, 1957

2,792,539

TRANSISTOR CONSTRUCTION

Kurt Lehovec, Williamstown, Mass., assignor to Sprague Electric Company, North Adams, Mass., a corporation of Massachusetts Application July 7, 1953, Serial No. 366,444

6 Claims. (Cl. 317—235)

Figures 1, 2, 3, 4:
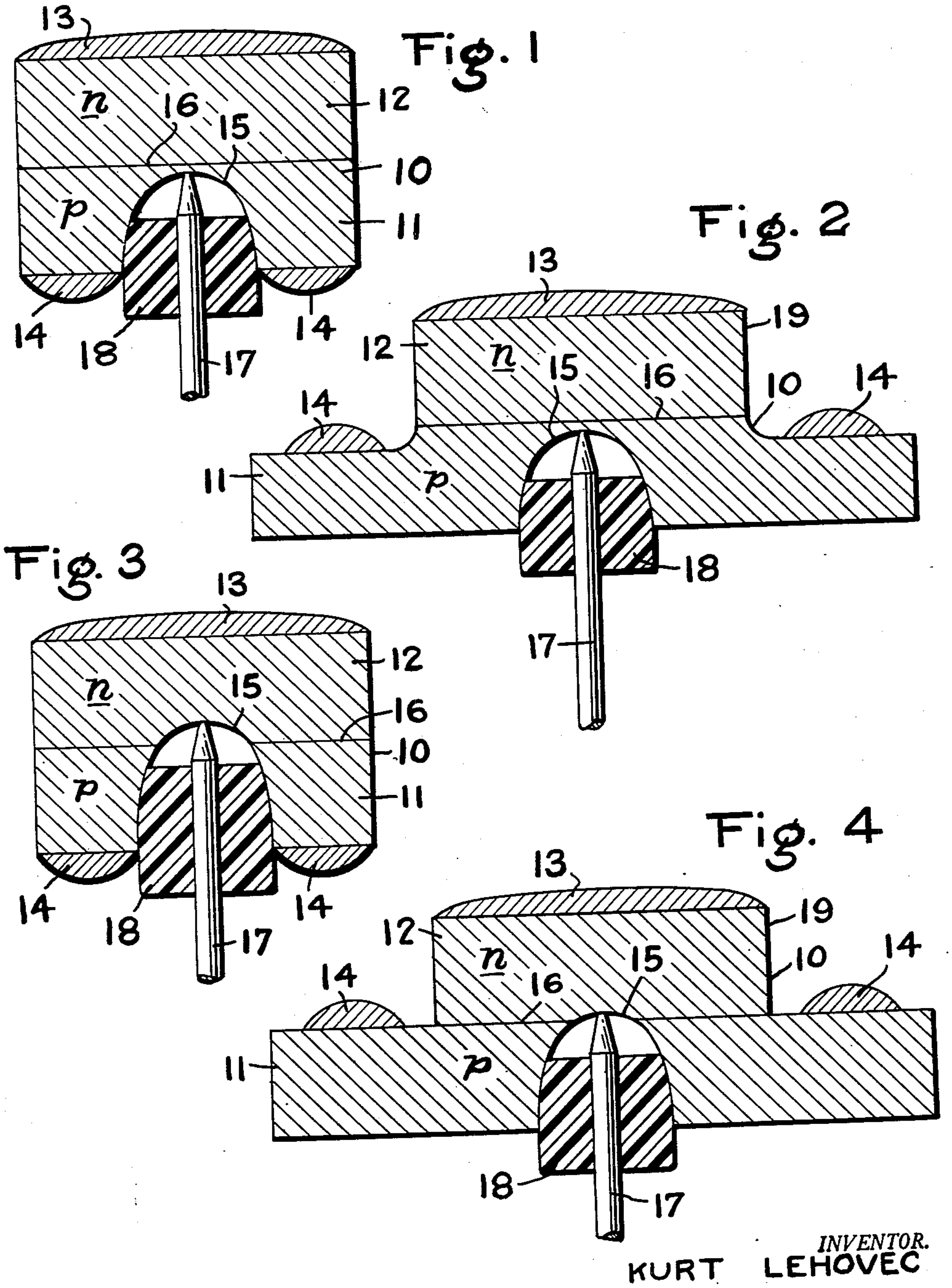

The present invention relates to a new and improved type of transistor construction.

Within the past few years, the subject of transistors has become of tremendous importance to the entire electronics industry by virtue of the advantages possessed by these devices. Inasmuch as a considerable volume of literature has been devoted to them, it is not believed necessary to discuss at length either the broad principals of the construction or their operation. Reference is made to the November 1952 issue of the Proceedings of the Institute of Radio Engineers which has a series of articles going into a great deal of detail on the subject matter.

Basically, two types of transistor constructions have come into promise. The first of these has two wire probes termed the emitter and the collector, respectively, bearing against the surface of a body of semi-conductive material, such as germanium. The second of these is the so-called junction transistor employing at least three regions of different conductivity within a body of a semi-conductor. It has presently become apparent that neither of these types of constructions is completely advantageous for modern high speed production techniques, inasmuch as both suffer from several production disadvantages.

It is an object of the instant invention to overcome the aforegoing and related disadvantages of prior transistor constructions. A further object of the invention is to produce a new and improved type of transistor utilizing one point contact and two low resistance or low ohmic connections. These and further objects of the invention, as well as the advantages of it, will be apparent from the description and claims, as well as the accompanying drawings in which:

Figure 1 diagrammatically shows a transistor of the instant invention;

Figure 2 diagrammatically shows a second modified transistor of the invention;

Figure 3 diagrammatically illustrates a third modified transistor of the invention, and Figure 4 diagrammatically shows a fourth modified transistor of the invention. For convenience, like numerals designate like parts in all figures of the drawings.

In general, the aforesaid and related objects of the present invention are achieved by producing a transistor consisting primarily of a body of a semi-conductive material having p and n regions of conductivity, this body being provided with low ohmic connections to each of said regions of conductivity, and being further provided with a rather small depression extending into the body of material until it is immediately adjacent, no further than twenty mils, to the barrier region between the p and n conductivity layers or regions of the semi-conductive materials, and a wire pointed electrode projecting into this depression and making contact with region adjacent to the p–n barrier.

This type of construction will be more fully shown from the drawings. In Figure 1, a new transistor is shown which consists of a semi-conductive body 10 having p and n regions 11 and 12. Each of these regions are provided with a low ohmic connection at 13 and 14, respectively, in accordance with known procedures in the art, such as soldering or plating. A small depression 15 projects into the body of the material 10 until it is immediately adjacent to the barrier 16 between the p and n conductivity layers 11 and 12. A wire probe 17 projects into this depression as shown and is spaced from the side walls of it in a fixed "packed" position by an inert spacer material 18. This material is conveniently manufactured in the shape of a preformed gasket from polyethylene or the like.

The modification of the device shown in Figure 2 differs from the device of Figure 1 in that one of the two low resistance connections 14 is positioned about a central boss 19 of the region of opposite conductivity on approximately the same level as the p–n barrier 16.

The construction of Figure 3 is quite closely related to that of Figure 1 and is inserted herein primarily to show that the depression 15 may project past the p–n barrier so that the point contact 17 makes contact with the layer of material opposite the side of the block 10 in which it is inserted. The same type of construction shown in Figure 3 is pictured in Figure 4. Here the depression 15, such as is used in Figure 2, also projects past the p–n barrier layer.

It will be realized by those skilled in the art that inasmuch as it is immaterial whether the depression extends from one side or the other of a p–n junction within a body of a semi-conducting material, such as for example, simple germanium or silicon, the invention herein described can be easily and conveniently put into production utilizing comparatively unskilled personnel. Of course, those skilled in the art will realize that the biasing of the external circuit employed with the transistors will vary depending upon the position of the wire probe utilized. The particular depressions herein set forth can be created in a variety of ways, such as, for example, by drilling with a common dental drill or by using an air blast apparatus. Preferably, the depressions created are etched in accordance with known procedures of the art following their production. They may also be heat treated so as to form the contact between the wire probe 17 and the body of the semi-conducting material.

It is to be emphasized that the present invention is a substantial improvement over the devices, such as are shown in the Shockley Patent No. 2,502,488, the Pearson et al. Patent No. 2,502,497, and the Shockley Patent No. 2,569,347 in that the single wire probe used cannot move during the use of the transistor, that is, during normal handling of the transistor. With devices such as are shown in the Shockley Patent No. 2,502,488, the emitter electrode is apt to shift to one side or the other of the p–n barrier employed necessitating a change in the external circuit so as to readjust the biasing. Also, there is little, if any, tendency for the single point probe used with the invention to be jarred loose so as to necessitate reforming of the probe junction operation if this has been carried out in manufacturing units of the present invention.

This invention is susceptible to further modifications in that other electrodes other than a mechanically positioned wire probe can be utilized. A welded wire contact, disclosed in my copending application, Serial No. 354,789, filed May 13, 1953, can be used in place of the wire probe to fix the point electrode to the surface of the semi-conducting material, which surface has the depression previously set forth in detail. Another variation is the utilization of a liquid metallic rectifying contact as the electrode and this is disclosed in detail in my copending application for "Rectifying Contact," Serial No. 364,457, filed on June 26, 1953.

Many minor details not directly pertaining to the inventive concept have been omitted from this specification. For example, the method of forming the wire probes and the types of encasing devices to hermetically seal the transistors of the present invention have not been discussed and any convenient arrangements can be used.

As many apparently widely different embodiments of this invention may be made without departing from the spirit and scope hereof, it is to be understood that the invention is not limited to the specific embodiments hereof except as defined in the appended claims.

What is claimed is:

1. A transistor comprising a body of semi-conductive material provided with p and n conductivity type regions joining each other in a junction layer, low resistance electrodes attached to said p and n regions, a depression positioned in one of said regions extending towards said junction layer, and a wire probe projecting into said depression and making a point electrical contact with said semi-conductive material adjacent to said junction layer.

2. A device as defined in claim 1 wherein said wire probe is held in position by a closely fitting ring of an inert dielectric material.

3. A device as defined in claim 1 wherein the wire probe is welded to the semi-conductive material.

4. A device as defined in claim 1 wherein said depression contains means for maintaining said contact within the volume defined by said depression.

5. A transistor comprising a body of semi-conductive material provided with p and n conductivity type regions joining each other in a junction layer, low resistance electrodes attached to said p and n regions, a surface depression in one of said regions, said depression extending towards said junction layer, and a point contact electrode in said depression making a point contact with one of said regions at a location not more than about 20 mils from said junction layer.

6. A transistor as defined in claim 5 wherein said depression extends through said junction layer and into the other of said regions.

References Cited in the file of this patent

UNITED STATES PATENTS

| | | |
|---|---|---|
| 2,560,594 | Pearson | July 17, 1951 |
| 2,655,624 | Welker | Oct. 13, 1953 |
| 2,666,814 | Shockley | Jan. 19, 1954 |
| 2,673,948 | Matare et al. | Mar. 30, 1954 |
| 2,701,326 | Pfann et al. | Feb. 1, 1955 |